Oct. 28, 1958
M. S. ANDRZEJEWSKI
2,857,990
ROTOR BRAKE SUSPENSION
Filed Feb. 15, 1955
2 Sheets-Sheet 1
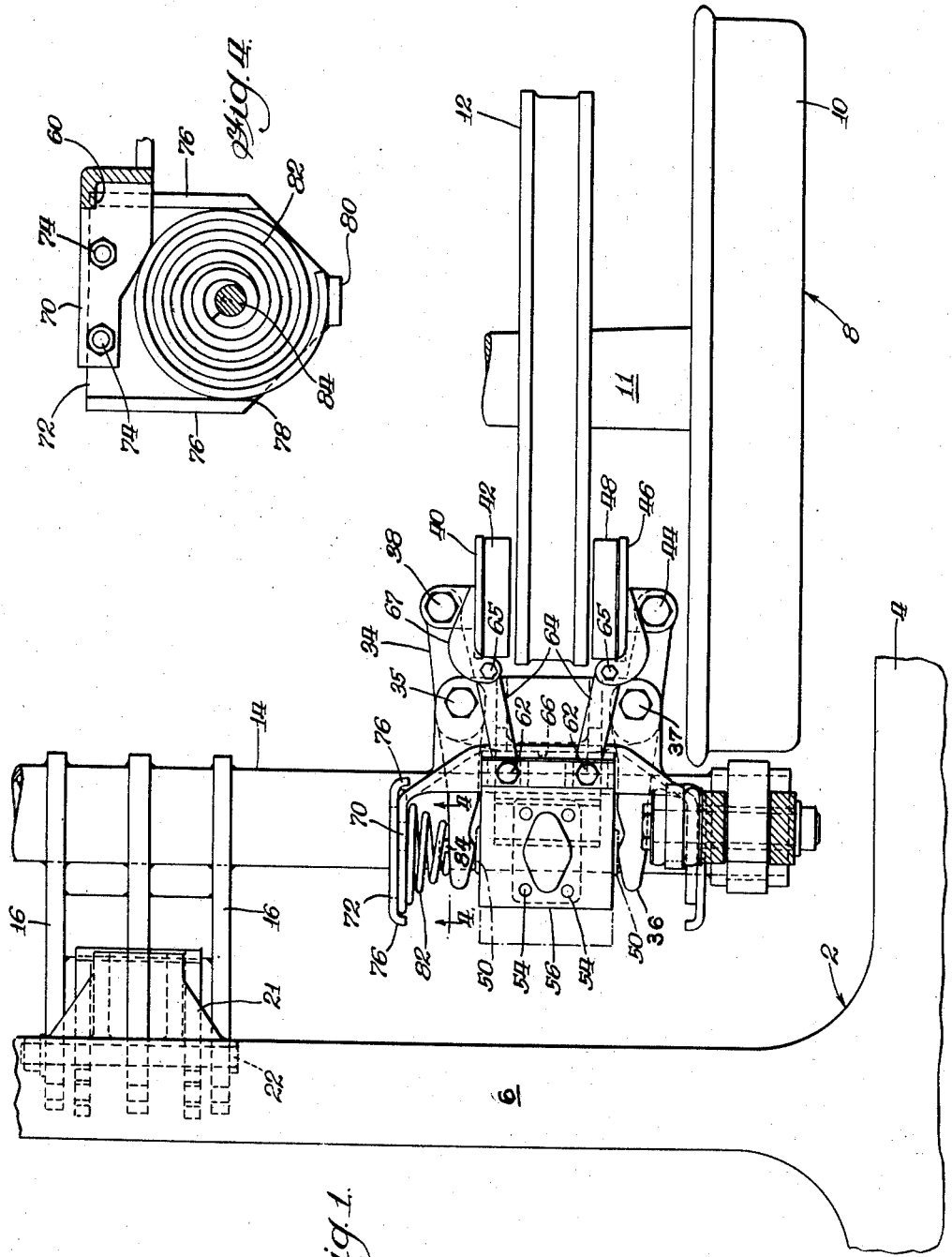
INVENTOR.
Matthew S. Andrzejewski
BY
Walter L. Schlegel, Jr. Atty.

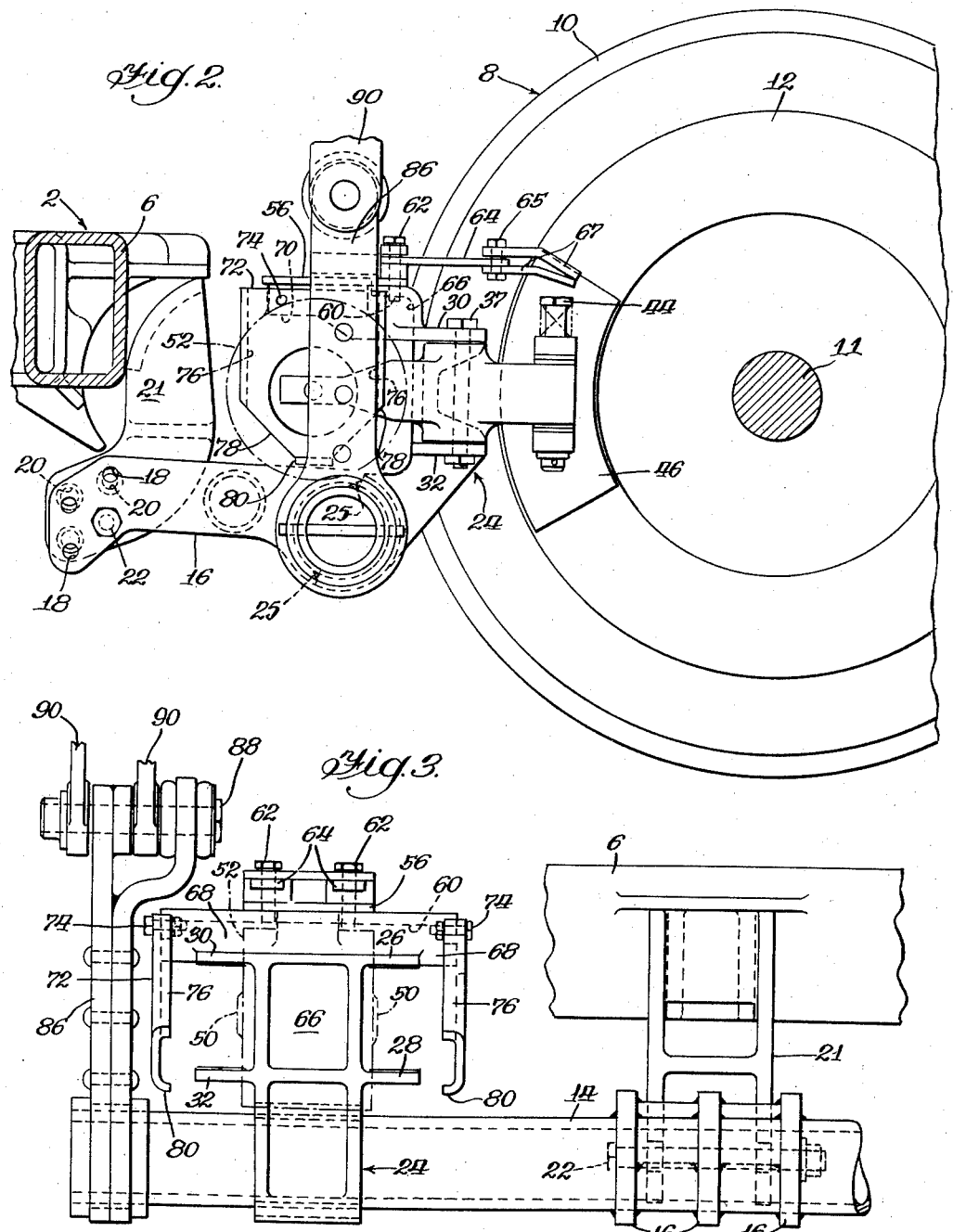

2,857,990

ROTOR BRAKE SUSPENSION

Matthew S. Andrzejewski, Chicago, Ill., assignor to American Steel Foundries, Chicago, Ill., a corporation of New Jersey Application February 15, 1955, Serial No. 488,233

5 Claims. (Cl. 188—205)

This invention relates to railway brakes and more particularly to an off-wheel brake wherein a rotatable brake rotor or disk is mounted for rotation with a wheel of a wheel and axle assembly and its associated brake means carried by a railway car truck supported by said assembly.

A primary object of the invention is to devise a compact and economical brake, the parts of which may be readily assembled and disassembled to facilitate servicing thereof.

A more specific object of the invention is to devise a novel combination brake lever fulcrum and release spring support affording pivotal fulcrums for brake levers and having wings extending above the brake levers for the mounting of release springs associated therewith.

A further object of the invention is to provide novel spring positioning plates, detachably connected to wings of the combination fulcrum and release spring support member to facilitate assembly and disassembly of the release springs for the brake levers.

Another object of the invention is to provide telescoping compression release springs accommodating maximum lever travel within available space limitations.

The foregoing and other objects and advantages of the invention will become apparent from a consideration of the following specification and the accompanying drawings, wherein:

Figure 1 is a fragmentary top plan view of a conventional railway passenger car truck having a preferred embodiment of the novel brake associated therewith, approximately one quarter of the truck being illustrated inasmuch as the arrangement is preferably symmetrical about the longitudinal and transverse center lines of the truck;

Figure 2 is a side elevational view of the structure shown in Figure 1;

Figure 3 is a front elevational view taken from the right as seen in Figure 2, and Figure 4 is a sectional view on line 4—4 of Figure 1.

In each of said figures certain details are omitted where more clearly seen in other views.

Describing the invention in detail and referring first to Figures 1 and 2, it will be seen that the railway car truck which is conventional comprises a frame generally designated 2 having a side rail 4 at each side thereof and a transom 6 extending transversely of the truck and interconnecting the side rails 4 adjacent each end of the truck. The truck frame 2 is supported in the usual manner by springs (not shown) mounted on equalizers (not shown) each of which extends longitudinally of the truck and is supported at each end thereof by a wheel and axle assembly generally designated 8 comprising a wheel 10 and a brake disk or rotor 12. The wheel 10 is attached to an axle 11 in the usual manner, and the rotor 12 is rotatable with the wheel by attachment thereto or to the axle.

The novel brake comprises a beam 14 attached to torque arms 16 having a plurality of aligned holes 18 selectively registrable with holes 20 of a torque arm bracket 21 attached in any desired manner to the transom 6 as by welding or casting integral therewith. A bolt and nut assembly 22 extends through one set of the aligned holes 18 and the registered holes 20 to afford a torque connection between the beam 14 and the transom 6.

A combination brake lever fulcrum and release spring support generally designated 24 is attached to the beam 14 in any desired manner as by welding at 25. The member 24 may be formed as a casting or as a weldment and comprises top and bottom inboard jaws 26 and 28 and top and bottom outboard jaws 30 and 32. A brake lever 34 is pivotally fulcrumed at 35 to the inboard jaws 26 and 28 and a brake lever 36 is similarly pivoted at 37 to the outboard jaws 30 and 32. The brake lever 34 is pivoted as at 38 to a brake head 40 carrying a brake shoe 42 for engagement with one side of the brake rotor 12, and the brake lever 36 is pivoted at 44 to a brake head 46 carrying a brake shoe 48 for engagement with the opposite side of the brake rotor 12.

The brake levers are actuated by opposed pistons fragmentarily indicated at 50 and received within a cylinder 52 removably attached as at 54 to a plate 56 detachably anchored to a flange 60 of the member 24 by screws 62 which also afford pivotal mounting for arms 64 pivoted at 65 to jaws 67 one pair of which is attached to the brake head 40 and the other pair of which is attached to the brake head 46 to maintain the brake shoes 42 and 48 in approximate parallelism with the inboard and outboard sides of the rotor 12.

The flange 60 of the member 24 is connected to a forward wall 66 thereof and to lateral walls 68 which diverge rearwardly from the wall 66 and are connected to substantially parallel flanges or wings 70. Each wing 70 is provided with a spring plate 72 detachably mounted thereto by bolt and nut assemblies 74. The spring plate 72 is provided with approximately vertical flanges 76 along the lateral edges thereof, said flanges terminating at downwardly converging edges 78 of the plate 72 which define a downwardly tapered segment thereof, the lower extremity of which is flanged as at 80. A conical helical release spring 82 is confined between each spring plate 72 and one of the brake levers 34 or 36. The large end of the release spring 82 seats against the plate 72 and is positioned by the flanges 76 and 80 thereof. The small end of the spring 82 seats against the related levers 34 or 36 and is positioned by a boss 84 thereof.

Thus it will be understood that upon actuation of the pistons 50 by means of a pressure fluid such as air or liquid therebetween, the related ends of the levers 34 and 36 are urged outwardly from each other to compress the release springs 82 as the shoes 42 and 48 are clamped against opposite sides of the rotor 12 to decelerate rotation of the wheel 10. Braking torque is transmitted to the transom 6 by the torque arms 16 and is transmitted to the side rail 4 by hangers 86 pivoted at their lower ends to the beam and pivoted at their upper end as at 88 to lugs 90 of the side rail 4. Only one hanger 86 is shown in the drawings and will suffice if only one rotor 12 is used; however, it is preferred to use one rotor adjacent each wheel 10, an arrangement which requires a hanger 86 at each end of the beam 14. It will be noted in this regard that most of the braking torque is transmitted to the frame 2 by the hangers 86 which are pivotally journaled to the ends of the brake beam 14, and the torque arms 16 function to transfer braking torque to the bracket 21 and to position the beam 14 in a desired rotative position about its longitudinal axis to properly position the brake shoes 42 with respect to the rotor 12. As above noted, the wheel and axle assembly 8 is preferably provided with a brake rotor 12 and associated brake mechanism such as that previously described adjacent a wheel 10 (not shown) at the opposite end of the wheel and axle assembly.

As the brake shoes 42 and 48 wear in service, the springs 82 are subjected to greater compression upon actuation of the brake levers 34 and 36 as above described, and it will be understood that under conditions whereat the brake shoes have been subjected to maximum wear, the springs 82 upon each brake application are telescoped to a substantially flat condition due to the conical shape of the springs and the manner in which they are mounted. This feature permits maximum spring travel within the available space limitations and affords an unusual compact and efficient release arrangement.

I claim:

1. In a brake arrangement for a railway car truck comprising at least one wheel and axle assembly having a pair of axially spaced rotatable friction surfaces and a truck frame supported by said assembly, the combination of: a brake beam supported by said truck frame and disposed to extend transversely thereof adjacent said assembly; and brake means carried by said beam, said brake means including a pair of brake levers carrying friction means engageable with said surfaces, power means operable to actuate said brake levers, and brake structure including a brake support rigidly secured to said beam and pivotally supporting said brake levers, said brake structure including a pair of spring plates detachably secured to the brake support and defining parallel transversely spaced vertical planes extending longitudinaly of the truck, a mounting plate detachably secured to the brake support at a location intermediate said spring plates and defining a plane extending transversely of the truck and normal to the first-mentioned planes, said power means comprising a duplex power cylinder detachably mounted on said mounting plate and having a pair of opposed pistons operatively connected to the respective brake levers, and a pair of release springs compressibly interposed between the spring plates and the respective brake levers.

2. A brake arrangement according to claim 1, wherein the compressional axes of said springs are in substantial alignment with the operational axes of said pistons.

3. A brake arrangement according to claim 1, wherein the springs are hollow and conical with their base ends seated on said spring plates to accommodate telescopic action thereof upon actuation of the pistons.

4. A brake arrangement according to claim 1, wherein each spring plate is provided with flanges at opposite sides thereof and wherein the bottom of each plate is also provided with a flange, said flanges positioning the base end of its respective release spring.

5. In a rotor brake suspension for a railway car truck comprising at least one wheel and axle assembly having a pair of axially spaced rotatable friction surfaces and a truck frame supported on said assembly and including a pair of longitudinally extending side members interconnected by at least one cross member extending transversely of the truck, the combination of: a brake beam disposed adjacent said assembly and extending transversely of the truck in a direction parallel to said cross member; a pair of hangers having their upper ends pivotally connected to the respective side members and having their lower ends pivotally connected to the opposite ends of the beam; brake means rigidly mounted on the beam, said brake means including a brake support, a pair of brake levers pivoted to the brake support and carrying friction means engageable with the respective friction surfaces, and power means supported by the brake support and operable to actuate said brake levers; and a torque transmitting connection between the beam and the cross member disposed intermediate said hangers, said connection including a pair of arms rigidly secured to the cross member and beam, respectively, each of said arms having at its free end a plurality of pin holes spaced both horizontally and vertically from each other, and pin means receivable in selectively aligned pin holes of the respective arms and operable to interconnect said arms in a plurality of positions to accommodate both the vertical and horizontal positionning of the beam relative to the assembly.

References Cited in the file of this patent

UNITED STATES PATENTS

| | | |
|---|---|---|
| 417,194 | Lawrence | Dec. 10, 1889 |
| 2,413,614 | Eksergian | Dec. 31, 1946 |
| 2,667,946 | Helsten | Feb. 2, 1954 |
| 2,780,317 | Bachman et al. | Feb. 5, 1957 |

FOREIGN PATENTS

| | | |
|---|---|---|
| 868,610 | Germany | Feb. 26, 1953 |